Feb. 6, 1940.  D. T. BROCK ET AL  2,189,192
BRAKE APPLYING MEANS FOR VEHICLES
Filed Aug. 28, 1937  2 Sheets-Sheet 1
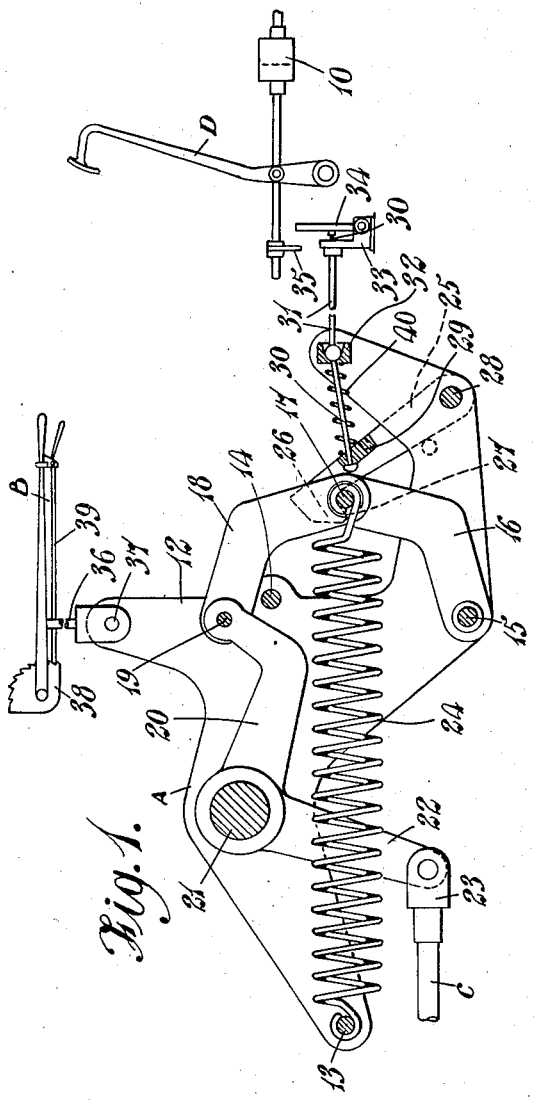
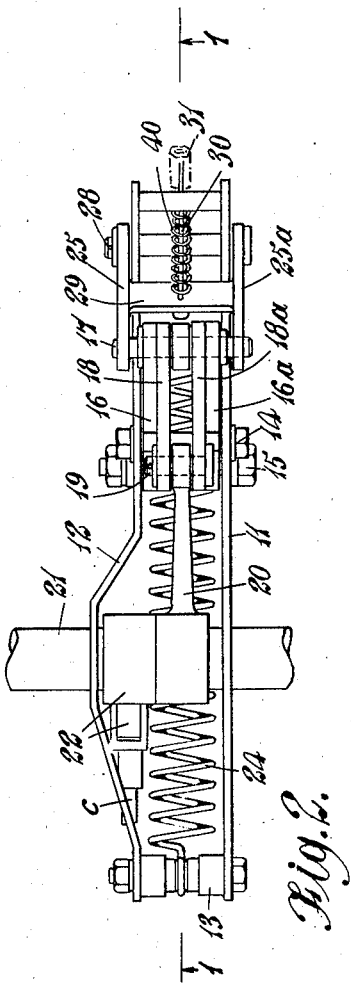
Inventors
Denis T. Brock
Geoffrey Robert G. Gates
By
J. R. Cox
Attorney Feb. 6, 1940.   D. T. BROCK ET AL   2,189,192
BRAKE APPLYING MEANS FOR VEHICLES
Filed Aug. 28, 1937   2 Sheets-Sheet 2
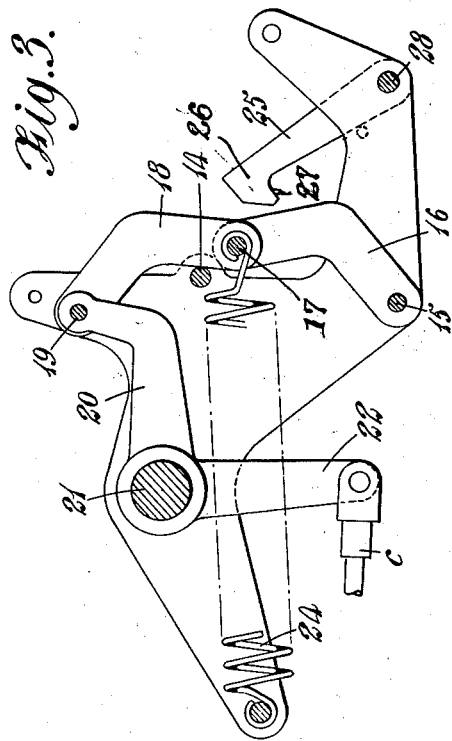
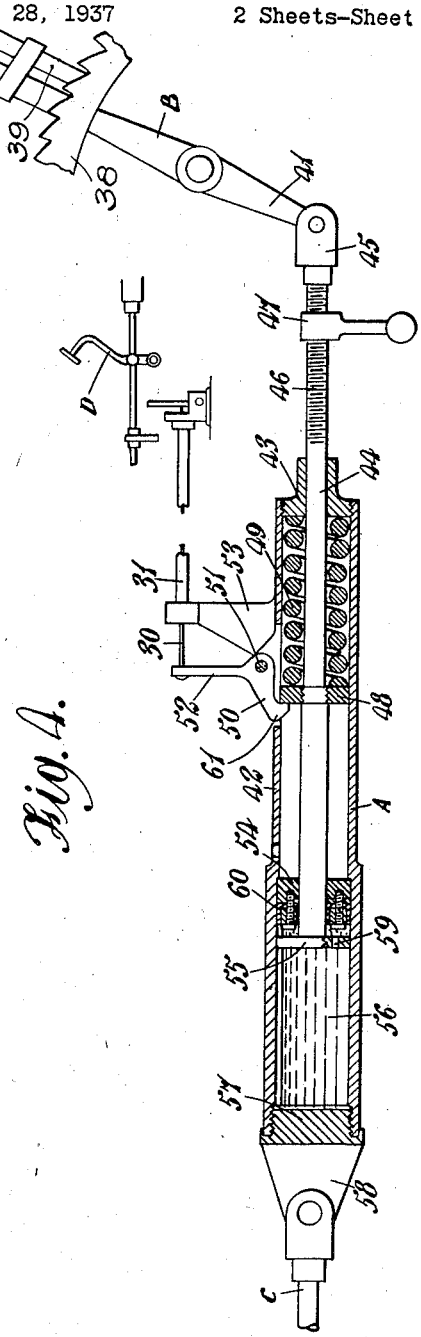
Inventors
Denis T. Brock
Geoffrey Robert G. Gates
By
J. R. Cox
Attorney Patented Feb. 6, 1940

2,189,192

UNITED STATES PATENT OFFICE 2,189,192

BRAKE APPLYING MEANS FOR VEHICLES

Denis Tabor Brock and Geoffrey Robert Greenbergh Gates, London, England, assignors to Automotive Products Company, London, England, a British company Application August 28, 1937, Serial No. 161,518
In Great Britain August 28, 1936

2 Claims. (Cl. 188—106)

The invention relates to brake applying means for vehicles, and more particularly to brake systems including a service brake usually controlled by a foot pedal and an emergency brake which is usually controlled by a hand lever.

It has been found that as the wear of the brake lining becomes excessive the brake pedal reaches such an extent of movement that it touches the floor-boards before the brakes are fully applied. To overcome this drawback, it has been proposed to provide means tending to apply the hand-brake and means for holding the hand-brake in "off" position, said holding means being adapted to be released as the applying means of the foot-brake reaches a predetermined extent of operating travel.

One object of the present invention is to provide a brake system in which the means tending to apply the hand-brake are interposed in a mechanical connection between the brake rigging and the hand lever or its equivalent by which said hand brake is normally applied.

Another object of the invention is to provide a brake mechanism including means tending to apply the hand brake automatically, said means, when released, causing a shortening of the connection between the hand lever or equivalent and the wheel brake assemblies, thereby applying the hand brake automatically without moving the hand lever which is objectionable, since upon sudden release of the holding means a violent movement of the hand lever may even cause injury to the occupants of the vehicle.

Another object of the invention is to provide a brake including a coiled spring which may conveniently be maintained in a stressed condition by a catch so as to be inoperative during the normal application of the hand-brake by the usual lever or equivalent, and means for releasing said catch to apply the hand-brake automatically in the event the brake pedal reaches a predetermined position in its operating travel.

A further object of the invention is to provide means for automatically applying the hand-brake and including a coiled spring acting at the intermediate pivotal joint of a toggle linkage, the two outer ends of which are connected respectively with the hand lever or equivalent and with the wheel brakes to be actuated by said hand lever or equivalent, the spring conveniently being maintained in a stressed condition by a catch which acts upon the toggle linkage, adjacent its intermediate pivotal point, and which is released to bring about the automatic application of the hand brake.

Another object of the invention is to provide means for automatically applying the hand-brake and including a coiled spring enclosed within a casing which is mechanically interposed between the hand lever or equivalent and the brake rigging actuated thereby, said casing being fitted with a catch by which the spring is normally maintained in a stressed condition.

Still another object of the invention is to provide damping means adapted to retard the automatic application of the hand-brake, thus enabling the danger of violent braking to be avoided.

Other objects and advantages of the invention will be apparent from the following specification referring to the accompanying drawings in which:

Figure 1 shows in sectional side elevation one form of handbrake-applying mechanism utilising a toggle linkage, the section being taken on the line 1—1 of Figure 2;

Figure 2 is a plan of the device shown in Figure 1;

Figure 3 is a side view illustrating the position of the parts when the handbrake has been automatically applied; and Figure 4 is a sectional side elevation of a modified form of system embodying damping means.

Referring firstly to the system shown in Figures 1 to 3, a device indicated generally at A is operatively interposed between the usual handbrake lever B of a motor vehicle and the brake rigging C which is to be actuated by the lever B. A brake pedal D is also provided for actuating the footbrakes of the vehicle by any suitable means, such for example as the hydraulic master cylinder indicated at 10.

The device A comprises a pair of side plates 11 and 12 (see Figure 2) which are maintained side by side in fixed relationship by means of spacing rods 13, 14 and 15. The rod 15 carries pivotally two twin link members 16 and 16a which are of angle shape as shown in Figure 1, and are pivotally attached by means of a pin 17 to similar twin links 18 and 18a. The links 16, 16a, 18, 18a thus form a toggle linkage having the pin 17 as its intermediate pivotal joint. The upper free end of the links 18, 18a are attached pivotally by a pin 19 to the free end of an arm 20 carried upon a shaft 21. The latter is pivoted in the plates 11 and 12 and carries also a brake-applying arm 22 to which the brake rigging C is attached by means of a fork member 23. The arms 20 and 22 constitute a bell crank lever, their angular relationship being fixed, although possibly adjustable.

A strong coiled tension spring 24 is disposed between the plates 11 and 12 and is attached at its ends to the spacing member 13 and the pin 17, the tendency of the spring 24 thus being to straighten the toggle linkage 16, 18. This forces the arm 20 in an upward direction and applies the handbrakes (not shown) by pulling upon the brake rigging C. The spring 24 is, however, held normally in its extended condition by a pair of catch members 25, 25a, each of which is of the shape shown in Figure 1 and has a projection 26 formed with a surface 27 adapted to engage the pin 17. The catch members 25, 25a, are both carried upon a pivot 28 and the direction of the surface 27 is substantially at right angles to the plane joining the axes of the pin 17 and pivot 28, thus avoiding any tendency of the catch device to become released of its own accord. The catch members 25, 25a are connected together by a transverse bar 29 to which the free end of the cable 30 of a Bowden wire control device 31 is attached, a transverse bar 32 secured between the plates 11 and 12 serving as the abutment for the sheath of said Bowden control. A coiled compression spring 40 is inserted on the cable 30 between the bar 29 and the bar 30 to urge the catch member 25—25a into the position shown in the Figure 1. At its other end the sheath of the control 31 engages a bracket 33 having a pivotally mounted lever 34 attached to the other end of the cable 30. Abutment 35 is moved by the pedal D, and when the stroke of the pedal reaches a predetermined value due for example to the clearance of the usual brake shoes becoming excessive, the abutment 35 contacts with the lever 34 when the footbrake is fully applied and the tension thus created in the cable 30 releases the catch members 25, 25a. The spring 24 is thus able to straighten the toggle linkage 16, 18, so applying the handbrakes without moving the handbrake lever B. The parts thus assume the position shown in Figure 3, the arm 22 moving to the right and pulling upon the brake rigging C.

In order to permit the actuation of the handbrakes by means of the lever B in the usual way said lever is connected by a tension link 36 and pin 37 with the upper part of the plates 11 and 12, while the hand lever B is fitted with a ratchet toothed quadrant 38 and a manually releasable detent device 39. The whole of the device A is mounted so as to pivot bodily upon the spindle 21, by which latter it is supported, and it will, therefore, be seen that when the hand lever B is raised while the device is in its locked condition as shown in Figure 1 the force applied through the tension member 36 is transferred from the spacing member 14 to the toggle links 18, 18a and thence to the arms 20 and 22.

When the device becomes released owing to excessive travel of the pedal D it is easily reset by pulling up the hand lever B. This applies an upward force to the bottom of the links 16, 16a and owing to the resistance to movement offered by the brake rigging C the toggle linkage 16, 18 is caused to shorten or fold until the pin 17 passes the projections 26 of the catch members 25, 25a, at which point said catch members assume their operative position under the influence of a coiled compression spring 40. It will be seen that the spacing member 14 prevents the toggle linkage 16, 18 from assuming a dead centre position, thus enabling the device to be reset merely by manipulating the hand lever B.

The embodiment described above, and illustrated in Figures 1–3, is claimed in our divisional application No. 294,896, filed September 14, 1939.

In the alternative construction which is shown in Figure 4, the device A is as a whole formed as a tension member acting between the brake rigging C and a downward extension 41 of the hand lever B. A tubular casing 42 is closed at one end by a bush 43 through which a tension rod 44 passes slidably, said rod being fitted with a fork member 45 and being formed with an extended screw-thread 46 carrying a resetting nut 47. Within the casing 42 the tension member 44 is fitted with an abutment collar 48, between which and the bush 43 a strong coiled compression spring 49 is positioned. This spring is maintained in a compressed condition by a catch member 50 pivoted at 51 to the casing 42 and having an arm 52 secured to the tension cable 30 of the Bowden control 31. A lug 53 upon the casing 42 serves as the abutment for the sheath of the Bowden control, which latter is actuated by excessive movement of the foot pedal D as previously explained. The tension member 44 is extended to pass slidably through a partition 54 in the casing 42, and is formed with a head 55 adapted to serve as a piston within a damping compartment 56. This compartment, which is bounded at one end by a plug 57 having a lug 58 for attachment to the brake rigging C, contains oil or other liquid and preferably a small quantity of air, while the head 55 is formed with a restricted passageway 59. Leakage of liquid past the partition 54 is prevented by convenient means, such as a packing cup 60. Violent movement of the tension member 44 relative to the casing 42 under the action of the spring 49 is thus prevented on account of the resistance offered by the liquid to the movement of the head 55.

The device as shown in Figure 4 is in its normal state, so that when the hand lever B is moved the force imparted to the tension member 44 is transferred through the completely compressed spring 49 to the casing 42 and thence to the brake rigging C. The automatic actuation of the rigging C is brought about as before by the excessive movement of the pedal D which pulls upon the cable 30, thus releasing the catch 50 and permitting the compression spring 49 to expand. As the tension member 4 is stationary on account of the hand lever B the casing 42 is impelled towards the right by the spring 49, thus pulling upon the brake rigging C, but this movement cannot take place suddenly as the piston head 55 is damped by the liquid in the space 56.

For resetting the device the spring 49 is compressed by screwing the nut 47 along the tension member 44 until the triangular projection 61 upon the catch 50 automatically reengages with the collar 48. The nut 47 is then returned to its initial position at the right hand end of the screw-thread 46. In some cases the device may be reset by pulling upon the hand lever B, but this depends upon the strength of the spring 49.

If desired fluid damping means can be associated with the toggle linkage embodiment of the device. The brake rigging C can, if desired, be used for actuating a master cylinder or equivalent pressure creating unit.

Although the two specific embodiments of the invention have been illustrated on the drawings, it will be understood that various changes, including size, shape and arrangement of parts, may be made without departing from the spirit of the invention, and it is not our intention to limit its scope other than by the terms of the appended claims.

What we claim is:

1. In a mechanism of the class described the combination of a service brake, a control member for said service brake, an emergency brake, a control member for said emergency brake, means for automatically applying the emergency brake as the control member for the service brake has overcome a predetermined value, and damping means adapted to retard the automatic application of the emergency brake.

2. In mechanism of the class described, the combination of a service brake, a control member for said service brake, an emergency brake, a control member for said emergency brake, means connecting the control member for the emergency brake to said emergency brake and including a casing, a coil compression spring mounted in said casing and tending to apply the emergency brake, a catch member normally stopping the expansion of said spring and adapted to be released to permit expansion of said spring, thus causing application of the emergency brake, a space filled with liquid, a piston in said space having a rod connected to the control member for the emergency brake, and a restricted passage in said piston through which the liquid is forced upon application of the emergency brake.

DENIS TABOR BROCK.
GEOFFREY ROBERT
        GREENBERGH GATES.